United States Patent [19]
Wu et al.

[11] Patent Number: 5,723,231
[45] Date of Patent: Mar. 3, 1998

[54] POLYMER ELECTROLYTE AND AN ELECTROCHEMICAL CELL CONTAINING THE ELECTROLYTE

[75] Inventors: Han Wu, Barrington; Changming Li, Vernon Hills; Ke Keryn Lian, Northbrook, all of Ill.

[73] Assignee: Motorola, Inc., Schaumburg, Ill.

[21] Appl. No.: 762,477

[22] Filed: Dec. 9, 1996

[51] Int. Cl.$^6$ ..................................... H01M 6/04
[52] U.S. Cl. ................. 429/203; 429/190; 429/204; 429/207; 429/122; 252/62.2; 252/500; 361/525; 361/526; 204/252
[58] Field of Search ........................... 429/190, 203, 429/204, 207, 122; 204/252, 525; 361/526; 252/62.2, 500

[56] References Cited

U.S. PATENT DOCUMENTS

| | | | |
|---|---|---|---|
| 5,239,002 | 8/1993 | Ahmed et al. | 525/150 |
| 5,507,965 | 4/1996 | Padoy et al. | 252/62.2 |
| 5,587,872 | 12/1996 | Lian et al. | 361/525 |
| 5,604,660 | 2/1997 | Bai et al. | 361/525 |

*Primary Examiner*—Bruce F. Bell
*Attorney, Agent, or Firm*—Kelly A. Gardner; Dale Dorinski

[57] ABSTRACT

An electrolyte for an electrochemical cell is provided. The electrolyte is an admixture of $H_3PO_4$ and a high temperature polymer such as poly(benzimidazole) in ratios between 2:1 and 50:1. Fumed silica is added to the electrolyte at levels between 0.2% and 8% by weight. An electrochemical cell is fabricated using the electrolyte, and exhibits improved adhesion between the electrolyte and the electrode.

11 Claims, 3 Drawing Sheets

POLYMER ELECTROLYTE AND AN ELECTROCHEMICAL CELL CONTAINING THE ELECTROLYTE

TECHNICAL FIELD

This invention relates in general to polymer electrolytes, and more particularly to polymer electrolytes comprising a polymeric matrix or support structure and an electrolyte active species dispersed therein, and to an electrochemical cell containing the electrolyte.

BACKGROUND

Energy generation and storage has long been a subject of study and development. Of special importance is the storage of electrical energy in a compact form that can be readily charged and discharged such as rechargeable electrochemical batteries and/or electrochemical capacitors. High power, high current pulse rechargeable electrochemical charge storage devices are also becoming increasingly important in applications in which electrical pulses are demanded of the battery cells. Examples of such devices include digital communication devices, power tools, and portable computers to name but a few. In each of these devices, high electrochemical kinetic rate, long cycle life of the electrode material and good ionic conductivity of the electrolyte are all extremely important considerations.

Most electrochemical cells have heretofore relied upon aqueous or liquid electrolytes to provide ionic conductivity between the electrodes thereof. Unfortunately, aqueous liquid electrolytes have problems associated with sealing, packaging, and electrolyte leakage, all of which are well known in the industry. Solid polymer electrolytes were developed by numerous different companies in an effort to address the problems associated with liquid aqueous electrolytes. Each of these different types of solid polymer electrolyte systems has met with varying degrees of success, typically owing to the fact that ionic conductivity is generally not as good as that found in a liquid aqueous system. Solid polymer electrolytes alleviate the problems experienced with respect to packaging and electrolyte leakage. In addition, polymer electrolytes have the advantage of being able to be formed into thin films to improve the energy density, and to act as an electrode spacer in order to eliminate an inert separator used in the prior art.

One polymer electrolyte system which has received considerable interest particularly in electrochemical capacitor applications is polyvinyl alcohol (PVA) having dispersed therein a proton conducting electrolyte active species such as $H_2SO_4$ or $H_3PO_4$. This system is described in, for example, U.S. patent application Ser. No. 08/547,821 to Lian, et al., filed Oct. 25, 1995. An improved electrolyte containing polybenzimidazole (PBI) in place of the PVA has also been disclosed in U.S. patent application Ser. No. 08/693,780 to Li, et al., filed Jul. 22, 1996. Capacitors and batteries sometimes need to be used in high temperature environments, such as in automotive engine compartments, or in surface mounting on printed circuit boards requiring temperature tolerances of up to 250° C. Unfortunately, the PVA/$H_3PO_4$ electrolytes developed heretofore must operate at temperatures less than 65° C. because the PVA polymer degrades above this temperature. The PBI/$H_3PO_4$ cells exhibit improved temperature response, but suffer from low adhesion between the electrolyte and the electrode. This needs to be improved in order to create a cell with optimum properties.

Accordingly, there exists a need to provide novel electrochemical devices incorporating electrolyte materials free from the limitations inherent in the prior art. Such electrolyte materials should be characterized by exhibiting high adhesion to the electrode and being capable of withstanding elevated temperatures. Further, such a material should be easily manufactured and economical for use in consumer electrochemical devices. Finally, fabrication of such an electrolyte layer should be relatively simple, inexpensive and readily repeatable.

DETAILED DESCRIPTION OF THE PREFERRED EMBODIMENT

Figure 1:
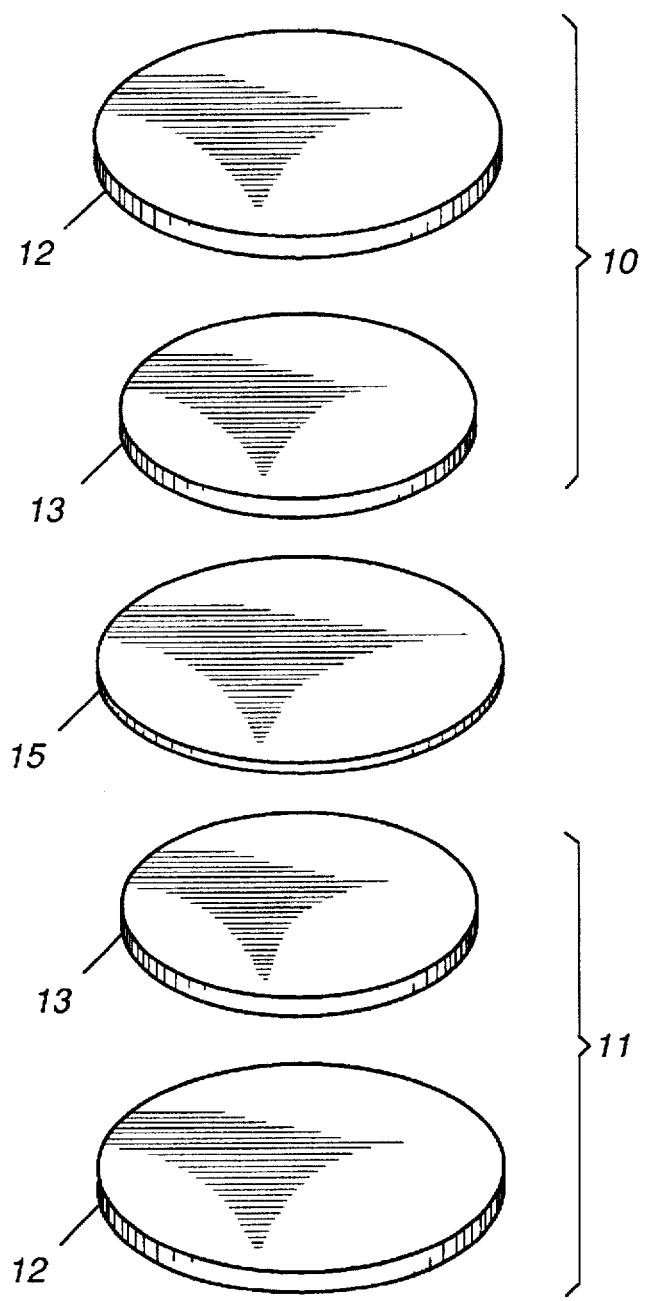
FIG. 1 is a schematic representation of an electrochemical charge storage device in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an energy storage device such as an electrochemical charge storage device fabricated from a pair of electrode assemblies 10 and 11, which may be the anode and the cathode of the device. The electrochemical charge storage device may be an electrochemical capacitor or an electrochemical battery cell. The electrochemical capacitor is preferably an electrochemical capacitor characterized by an oxidation/reduction charge storage mechanism. Each electrode assembly 10 and 11 includes an electrode 13 which electrodes may either be fabricated from the same or different materials. In the instance in which the electrodes are fabricated of the same material, they are referred to as "symmetric electrodes". Conversely, if they are made from different materials, they are referred to as "asymmetric electrodes". Regardless of whether or not the electrodes are asymmetric or symmetric, they may be each made from one or more materials selected from the group consisting of ruthenium, iridium, platinum, cobalt, tungsten, vanadium, iron, nickel, molybdenum, silver, zinc, lead, manganese, alloys thereof, nitrides thereof, carbides thereof, sulfides thereof, oxides thereof, borites thereof, phosphites thereof, and combinations thereof. Alternatively, said electrodes may be fabricated of conducting polymers or activated carbon.

Each electrode assembly may further include a current collector 12 which is electrically conducting. The current collector 12 is preferably chemically inert in the polymer electrolyte 15 described hereinbelow. The electrolyte 15 is sandwiched between the electrodes and is in the form of a film, such as a polymer, which may also serve as a separator between the two electrodes. This structure thus affords free and unobstructed movement to the ions in the electrolyte. The combination electrolyte/separator prevents contact between the opposing electrodes since such a condition would result in a short circuit and malfunction of the electrochemical cell.

Figure 2:
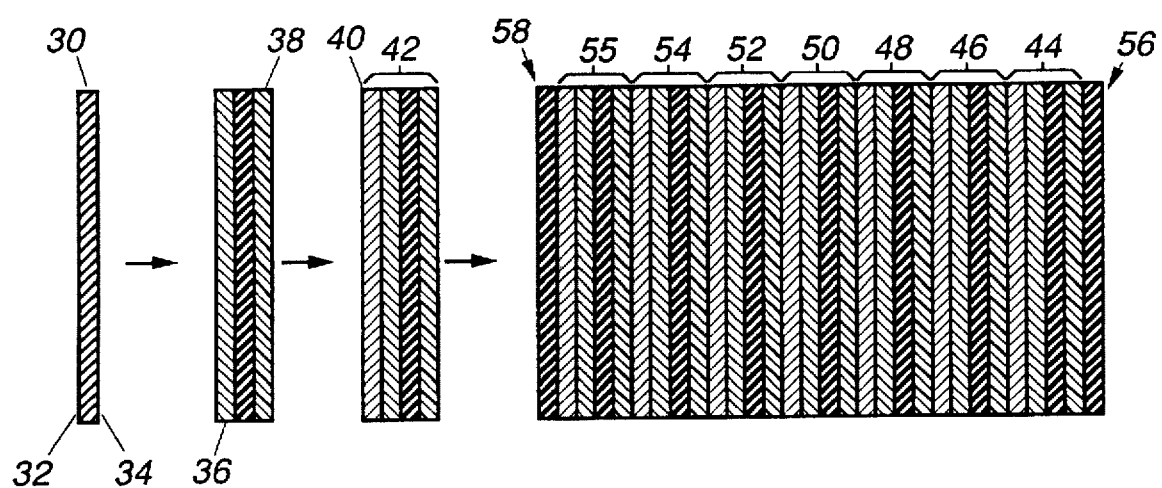
FIG. 2 is a schematic representation of a second electrochemical charge storage device in accordance with the instant invention.

Referring now to FIG. 2, there is illustrated therein a second electrochemical device, such as an electrochemical capacitor, which may be adapted to employ an electrolyte material such as that disclosed hereinbelow. The device of FIG. 2 is a bipolar electrochemical capacitor device which includes a first layer 30 which is a bipolar metal substrate or foil. The bipolar metal foil is fabricated to be both the substrate upon which active electrode materials are deposited, as well as a current collector for the charge generated by the materials. Accordingly, layer 30 may be fabricated of a number of different materials selected from the group consisting of carbon, aluminum, titanium, copper, nickel, brass, stainless steel, gold, silver, titanium/tantalum alloys, alloys thereof, and combinations thereof. Layer 30 includes first and second major surfaces 32 and 34 upon which are deposited layers of electrode active material 36 and 38. The electrode active materials may be fabricated of symmetric or asymmetric materials such as those described hereinabove with respect to FIG. 1.

Disposed upon at least one of said electrodes is a layer of an electrolyte material 40 in accordance with the instant invention. The electrolyte material 40 as illustrated in FIG. 2 is disposed upon electrode layer 36. As may be appreciated from FIG. 2, a completed single cell bipolar device 42 comprises a bipolar metal foil, with electrodes disposed on either side of said foil and a layer of electrolyte material disposed on at least one of said electrodes. Incorporated into a multicell device, a plurality of such single cells may be arranged in stacked configuration. Accordingly, seven such devices 44, 46, 48, 50, 52, 54, and 55 may be arranged in stacked configuration in order to increase the voltage output therefrom. The knowledgeable reader will appreciate that the number of cells arranged in stacked configuration may be varied, depending on the performance that one desires to extract from the multicell device. Disposed adjacent the outer most cells 44 and 55 are end plates 56 and 58 adapted to collect current generated by the stacked cells. It is to be understood that while the devices illustrated with respect to FIGS. 1 and 2 are electrochemical capacitors, the invention is not so limited. Indeed, the electrolyte material described hereinbelow, may be readily adapted for use in capacitors, electrochemical battery cells, fuel cells, electrochemical sensors, and any other type of electrochemical cell requiring an electrolyte material for providing ionic conductivity.

The electrolyte materials described herein may be fabricated by providing a powdered polymeric precursor material characterized by either a melting temperature or heat deflection temperature in excess of at least 100° C. The powdered polymeric precursor material is preferably a powdered linear polymeric precursor material. Examples of such material include, but are not limited to, poly(benzimidazole) (PBI), poly(ethyleneoxide) (PEO), poly(acrylamide) (PAAM), poly(vinylpyrrolidone) (PVP), poly(vinylpyridine) ($P_2VP$), poly(ethyleneimine) (PEI), poly(acrylic acid) (PAA), poly (aminosilicates) (PAS) and combinations thereof. In a preferred embodiment, the powdered polymeric precursor material is PBI.

The powdered polymeric precursor material is then mixed with an acidic electrolyte or other ion conducting species which likewise has a boiling point or decomposition temperature greater than 100° C. The acidic electrolyte is provided to protonate the polymeric precursor material thus imparting the characteristic of high ionic conductivity. The ion conducting species is preferably a proton conducting species, and is preferably an acid selected from the group consisting of $H_3PO_4$, $H_2SO_4$, HCl, $HClO_4$, $HNO_3$, and combinations thereof. Alternatively, other ion conducting species, such as organic acids, may also be used.

The electrolyte active species and the powdered polymeric precursor material are mixed together and heated to temperatures in excess of at least 100° C. The heating provides several useful functions including, expanding substantially the free volume of the polymeric precursor material thus allowing more of the electrolyte active species to react with sites in the polymeric precursor material. Moreover, heating to temperatures in excess of 100° serves the additional beneficial function of vaporizing liquid water which may be present in the system. Accordingly, by driving off moisture, the electrolyte material resulting from the process described herein may be employed in high temperature environments without experiencing the shortcomings and limitations characteristic of the prior art.

Figure 3:
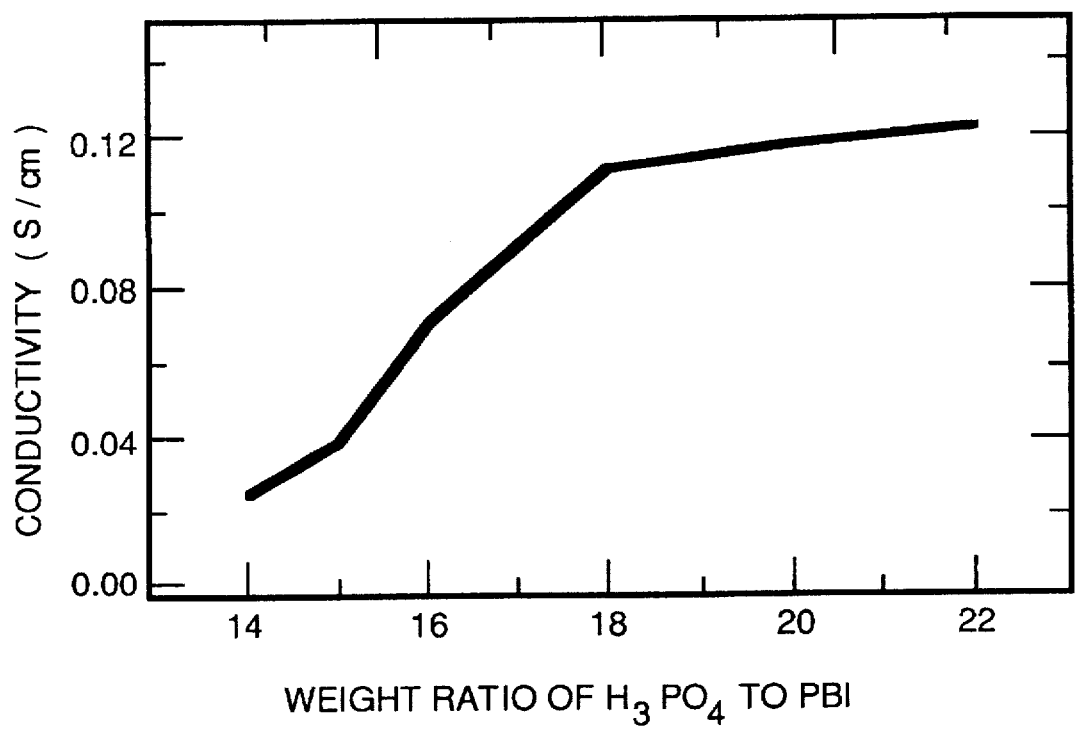
FIG. 3. is a chart illustrating the conductivity versus the ratio of electrolyte active species to polymer precursor material for an electrolyte system in accordance with the instant invention.

The ion conducting species and the powdered polymeric precursor material may be mixed in varying ratios of one to the other. In one embodiment, the ratio of the electrolyte active species to the powdered polymeric material is in the range of between 2:1 and 50:1 and preferably between 20:1 and 30:1. The powdered polymeric material is PBI, and is mixed with $H_3PO_4$, as the ion conducting species. A summary of the effect of varying the weight ratio of the ion conducting species to powdered polymeric material may be appreciated from a perusal of FIG. 3. As may be appreciated, conductivity climbs until approximately 0.12 Siemens per centimeter (S/cm) at a ratio of 22:1 acid to polymer. However, as noted previously, although this electrolyte material has improved thermal and electrical properties over the prior art, when employed in an electrochemical cell, the adhesive bond formed between the electrolyte and the electrode sometimes fails. We have found that the addition of a small amount of fumed silica to the high temperature polymer/phosphoric acid gel electrolytes previously disclosed significantly improves the adhesion of the electrolyte to the electrode. This improved adhesion allows the fabrication of an electrochemical cell that is much more mechanically robust. Levels as low as 0.2% by weight of fumed silica in the electrolyte show improvement. Addition of fumed silica above about 8% by weight causes the conductivity of the resulting electrolyte to decrease. In practice, we find that 0.5 to about 5% fumed silica by weight is the preferred range.

To prepare the electrolyte, the silica is added after mixing the PBI with the $H_3PO_4$, and the mixture is heated to approximately 120°–270° C. (190°–195° C. preferred) for 30 minutes to evaporate moisture and to insure adequate interaction between the $H_3PO_4$ and the PBI. During this time, the resulting mixture tends to change color from a rusty red to a dark brown. Upon cooling to room temperature, the solution converts to a high viscosity gel-type material. This electrolyte material has conductivities approaching those of the acidic electrolyte in liquid form alone, allows the material to be used in high temperature environments and stays tightly bonded to the electrode materials. The addition of fumed silica to the electrolyte did not significantly alter the electrolyte's conductivity. Additionally, since the price of fumed silica is significantly lower than the price of the polymer, our invention lowers the price of the electrolyte by substituting a low price material for a high price material. Thus, an electrolyte with improved properties has been achieved while lowering the price.

These materials are extremely viscous, uniform, one-phase gels, and the ultimate viscosity of the electrolyte material depends on the amount of the acid electrolyte active species incorporated therein. The lower the concentration of the electrolyte active species, the higher the viscosity of the final product. The viscosity of the material is also an advantage from the standpoint of device fabrication in that the electrode material may be applied on electrode surfaces by painting, screen printing, doctor-blading, stencil printing, rollercoating, transfer pad printing, rotogravure, flexographics, lithographics, and any number of other techniques well known in the art.

The invention may be better understood from a perusal of the following examples.

Preparation of the electrolyte

The electrolyte material was fabricated by placing 4 g of powdered PBI in a container and mixed with 96 g of 85% $H_3PO_4$. The mixture had a ratio of 24:1, acid to polymer. Fumed silica was then added to the acid/polymer mixture in ratios varying between 0.6% by weight to 3.2% by weight. The mixture was then heated to drive off the moisture.

Preparation of electrochemical cells

Electrodes used in the following examples were made from ruthenium dioxide deposited on 1 cm$^2$ titanium substrates. A layer of the chosen electrolyte material was coated on the electrodes, and an electrochemical cell was formed by sandwiching two electrodes together so that the electrolyte separated them. The resistivity and capacitance of each cell was measured, and the cells were then heated in an oven at 120° C. for one hour, cooled to ambient temperature, and then measured again. The results are shown in Table 1.

TABLE 1

| Concentration of Fume Silica | Before Heat Treatment | | After Heat Treatment | |
|---|---|---|---|---|
| | Resistivity (Ohm-cm) | Capacitance (mF/cm$^2$) | Resistivity (Ohm-cm) | Capacitance (mF/cm$^2$) |
| 0.6% | 15.63 | 45 | 7.69 | 57 |
| 0.9% | 13.33 | 46 | 7.14 | 58 |
| 1.9% | 16.95 | 43 | 8.33 | 56 |
| 3.2% | 11.77 | 46 | 6.25 | 57 |

It is observed from Table 1 that the resistivity of the electrolyte remains essentially constant when the concentration of the fumed silica is varied over the range of interest. At higher concentrations of fumed silica, the viscosity of the resulting becomes too high to be easily processed. After the cells were heated, the resistivity decreased and the capacitance increased, thus indicating a performance improvement. We believe that the electrolyte viscosity reduces at elevated temperatures, thus allowing the gel electrolyte to further penetrate into the pores and other surface irregularities of the electrodes, thus increasing the contact between the electrode and the electrolyte.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrolyte for an electrochemical cell, comprising: an admixture of an ion conducting electrolyte having a boiling point or decomposition temperature greater than 100° C. and one or more polymers selected from the group consisting of poly(benzimidazole), poly(acrylamide), poly(vinylpyrrolidone), poly(vinylpyridine), poly(ethyleneimine), poly(acrylic acid), and poly(aminosilicate) in ratios between 2:1 and 50:1, the admixture further containing between 0.2% and 8% by weight of fumed silica.

2. An electrolyte as in claim 1, wherein the polymer is poly(benzimidazole).

3. An electrochemical cell comprising:
first and second electrodes fabricated from materials selected from the group consisting of Ru, Ir, Pt, Co, W, V, Fe, Ni, Mo, Ag, Zn, Pb, Mn, alloys of the foregoing, oxides, nitrides and carbides of the foregoing, conductive polymers, carbon black, and combinations thereof,
wherein the electrodes are separated by an electrolyte material comprising an admixture of:
an acid having a boiling point or decomposition temperature greater than 100° C.;
one or more polymers selected from the group consisting of poly(benzimidazole), poly(ethyleneoxide), poly(acrylamide), poly(vinylpyrrolidone), poly(vinylpyridine), poly(ethyleneimine), poly(acrylic acid), and poly(aminosilicate) in ratios between 2:1 and 50:1; and
fumed silica, between 0.2% and 8% by weight.

4. An electrochemical cell as in claim 3, wherein the polymer is poly(benzimidazole).

5. An electrochemical cell as in claim 3, wherein the electrolyte material is a gel.

6. An electrochemical cell as in claim 3, wherein the electrolyte material is positioned between and adheres to the electrodes.

7. An electrochemical cell as in claim 3, wherein the first electrode contains the same materials as the second electrode.

8. An electrochemical cell as in claim 3, wherein the first and second electrodes contain different materials.

9. An electrochemical cell as in claim 3, wherein the electrodes are fabricated of Ru.

10. An electrochemical capacitor comprising:
two $RuO_2$ electrodes separated by a gel electrolyte including an admixture of $H_3PO_4$ and poly(benzimidazole) in a ratio between 20:1 and 30:1 and between 0.5% and 5% by weight of fumed silica.

11. An electrochemical capacitor as in claim 10, wherein the gel electrolyte is positioned between and adheres to the electrodes.

* * * * *